(12) United States Patent
McVicar

(10) Patent No.: US 8,425,320 B1
(45) Date of Patent: Apr. 23, 2013

(54) VARIABLE SENSOR BASED GATED SHIFTER CONVERTIBLE TO SEQUENTIAL SHIFTER MODE

(75) Inventor: David Neil McVicar, El Dorado, CA (US)

(73) Assignee: Logitech Europe S.A., Morges (CH)

( * ) Notice: Subject to any disclaimer, the term of this patent is extended or adjusted under 35 U.S.C. 154(b) by 1764 days.

(21) Appl. No.: 11/435,085

(22) Filed: May 15, 2006

Related U.S. Application Data

(60) Provisional application No. 60/681,713, filed on May 16, 2005.

(51) Int. Cl.
*A63K 3/00* (2006.01)

(52) U.S. Cl.
USPC .............................................. 463/38; 434/71

(58) Field of Classification Search .............. 463/36–38; 434/71; 74/397, 473.18
See application file for complete search history.

(56) References Cited

U.S. PATENT DOCUMENTS

| | | | | |
|---|---|---|---|---|
| 5,197,003 A | * | 3/1993 | Moncrief et al. | 434/71 |
| 5,566,582 A | * | 10/1996 | Beadle et al. | 74/473.19 |
| 6,030,291 A | * | 2/2000 | Maki et al. | 463/38 |
| 2003/0188594 A1 | * | 10/2003 | Levin et al. | 74/473.12 |
| 2007/0082735 A1 | * | 4/2007 | Bell | 463/38 |

* cited by examiner

*Primary Examiner* — Sunit Pandya
*Assistant Examiner* — Allen Chan
(74) *Attorney, Agent, or Firm* — Kilpatrick Townsend & Stockton LLP

(57) ABSTRACT

A transmission-gear-selection device includes knob means; shaft means coupled to the knob means; and shift means coupled to the shaft means and configured to shift gears for a driving simulator and/or driving game as the knob means and shaft means are manipulated by a user, wherein the knob means and shaft means are configured to be manipulated for gated shifting. Gated shifting includes the simulation of a transmission of a vehicle that is simulated by the driving simulator and/or the driving game.

14 Claims, 3 Drawing Sheets

VARIABLE SENSOR BASED GATED SHIFTER CONVERTIBLE TO SEQUENTIAL SHIFTER MODE

CROSS-REFERENCES TO RELATED APPLICATIONS

This application is related to and claims priority from U.S. Provisional Application No. 60/681,713, filed May 16, 2005, and is fully incorporated herein by reference for all purposes.

BACKGROUND OF THE INVENTION

The present invention generally relates to input devices for automobile driving simulators for use with a computer, and more specifically relates to a transmission-gear-selection device and method of operation therefore.

Computer based driving simulators and games are typically designed to operate transmission gears of a simulated vehicle sequentially. Such sequential-mode shifting generally provides that the user may shift one gear up or one gear down, but may not skip gears. For example, to shift from first gear to third gear, the user generally shifts from first gear to second gear, and then from second gear to third gear. While this adequately simulates "paddle style" shifters it does not provide for realistic "gated" shifting, where a driver can down shift, for example, from forth gear to second gear.

Therefore, a new transmission-gear-selection device is needed for game control, driving simulation, etc. and that is configured to provide non-sequential shifting (or gated shifting) through six or more forward gears in a user selected order.

BRIEF SUMMARY OF THE INVENTION

A transmission-gear-selection device is provided that includes knob means; shaft means coupled to the knob means; shift means coupled to the shaft means and configured to shift gears for a driving simulator and/or driving game as the knob means and shaft means are manipulated by a user, wherein the knob means and shaft means are configured to be manipulated for gated shifting. Gated shifting includes the simulation of a transmission of a vehicle that is simulated by the driving simulator and/or the driving game. The shift means is user configurable for sequential shifting.

A further understanding of the nature and advantages of the present invention may be realized by reference to the remaining portions of the specification and the drawings.

DETAILED DESCRIPTION OF THE INVENTION

The present invention generally provides an input device and a method for automobile driving simulators and games, and more specifically provides a transmission-gear-selection device and a method of operation therefore. The transmission-gear-selection device is configured to provide the user with the opportunity to select six or more forward gears, in a user selected order. The transmission-gear-selection device is also configured to convert into an industry standard "sequential" shifter for use with "legacy" simulations and/or games.

Figure 1:
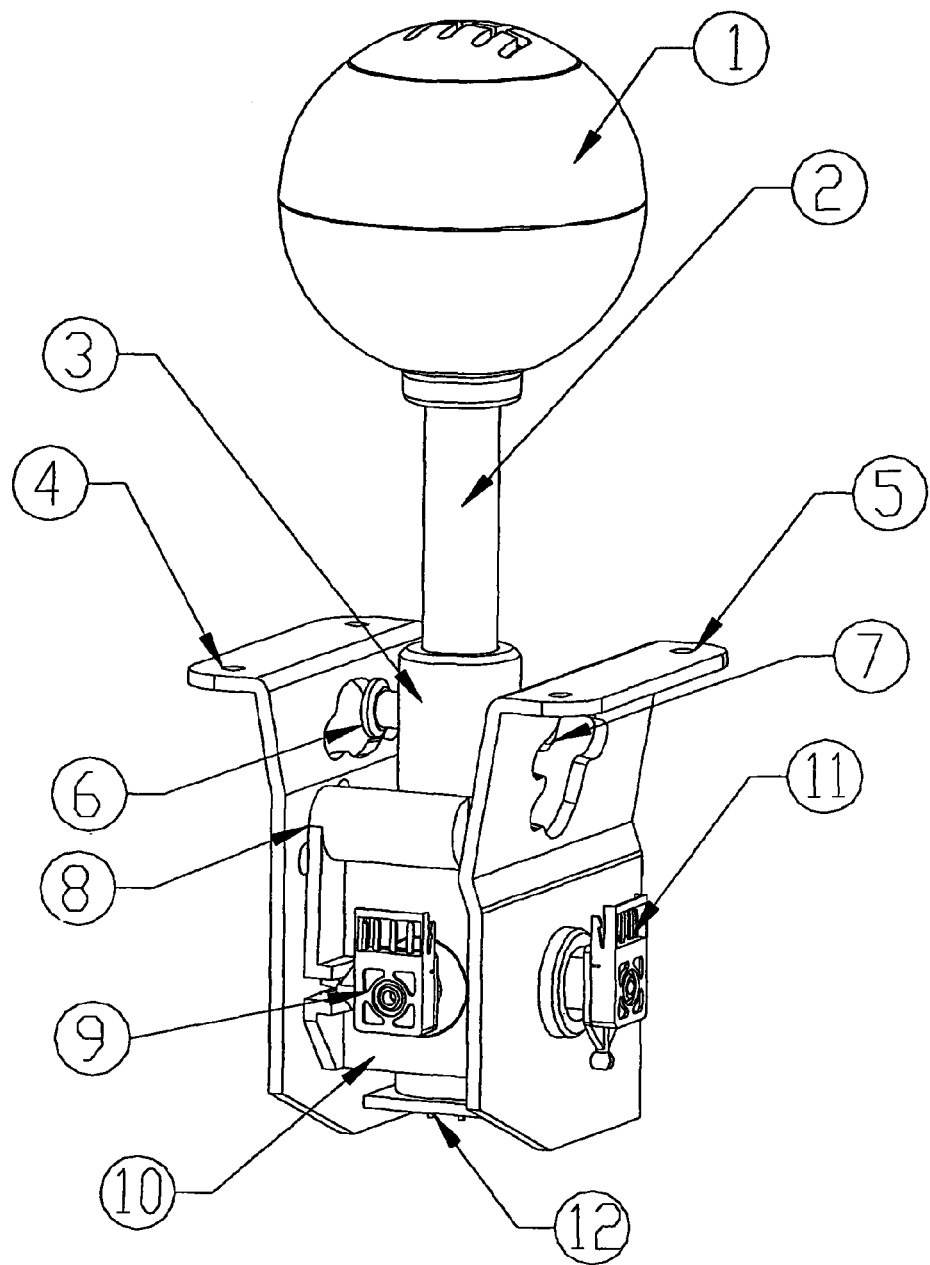
FIG. 1 is a perspective view of a transmission-gear-selection device according to an embodiment of the present invention.
Figure 2:
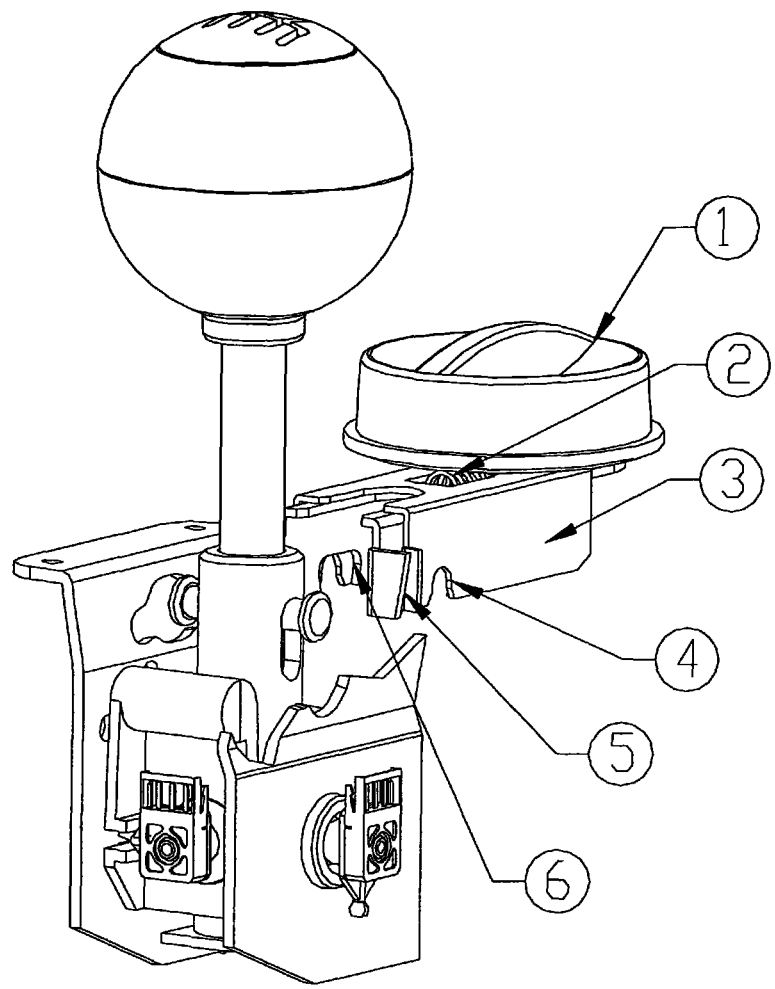
FIG. 2 is a perspective view of a transmission-gear-selection device according to another embodiment of the present invention.
Figure 3:
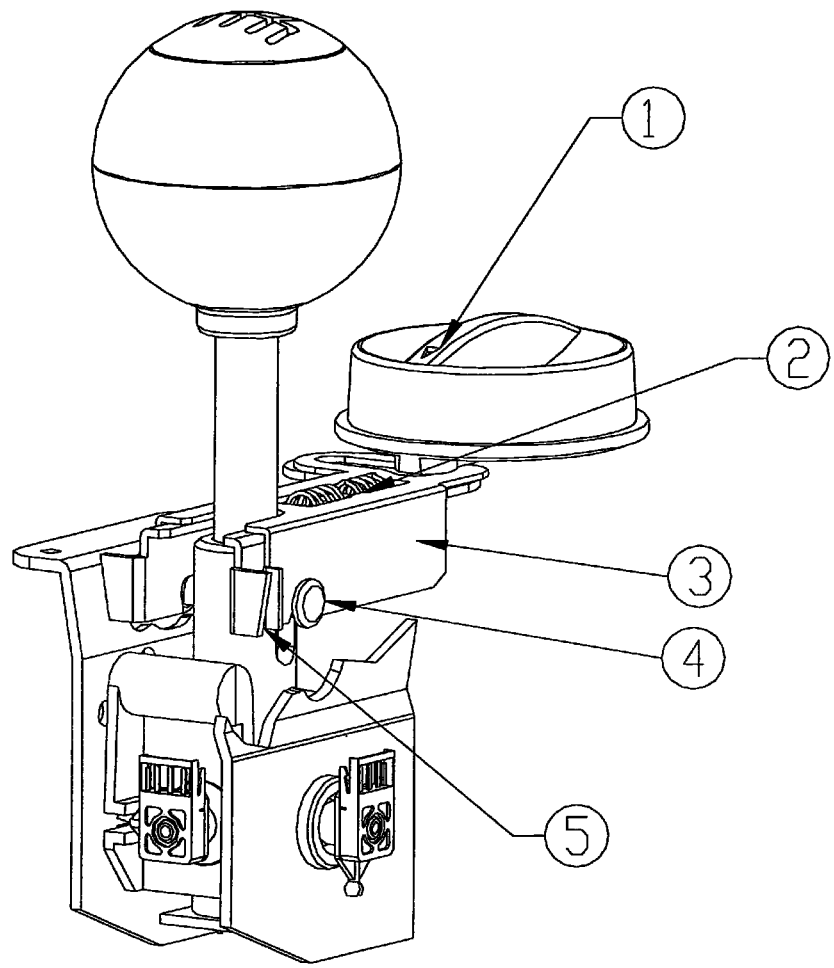
FIG. 3 is a perspective view of a transmission-gear-selection device according to another embodiment of the present invention.

FIGS. 1-3 are perspective views of a transmission-gear-selection device according to embodiments of the present invention. The transmission-gear-selection device includes a shifter knob (FIG. 1, ref. no. 1) and a shaft (FIG. 1, ref. no. 2) that is spring loaded into a gimbal "side to side" yoke (FIG. 1, ref. no. 3). The shaft is constrained from substantial rotation, and is configured for limited vertical travel, by a $1^{st}$, $2^{nd}$ gear latch pin (FIG. 1, ref. no. 6) and a $5^{th}$, $6^{th}$ reverse gear latch pin (FIG. 1, ref. no. 7). The "side-to-side" yoke is constrained by a "forward-to-back"Yoke (FIG. 1, ref. no. 10). The "forward-to-back" Yoke is constrained by a $1^{st}$, $2^{nd}$ gear latch plate (FIG. 1, ref. no. 4) and a $5^{th}$, $6^{th}$, reverse gear latch plate (FIG. 1, ref. no. 5). The "forward to back" yoke is configured to move between three positions: forward, center, and back, and is constrained in these movements by a latch plate detent ball and spring (FIG. 1, ref. no. 8). This latch plate detent ball and spring keeps the shifter shaft knob assembly and the shaft assembly in select gear position: $1^{st}$ gear, $3^{rd\ gear}$ and $5^{th}$ gear when pushed forward, and in the select gear positions: $2^{nd}$ gear, $4^{th}$ gear, and $6^{th}$ gear when pulled back. When the shifter knob assembly and shaft assembly are centered, the latch plate detent ball and spring keeps the device in "neutral," (i.e., no gear is selected). When the shifter knob assembly and shaft assembly are pushed down, then over to the right, and back into the 6th gear position, the shifter knob assembly and shaft assembly are detented into "reverse" gear. The gimbal mechanism uses a set of variable sensors (e.g., potentiometers) coupled to the shifter shaft via a gimbal to provide substantially constant location/position information of the shifter to a driving simulator, game box, etc. A side-to-side sensor of the set of variable sensors that is coupled to a "side-to-side" yoke (FIG. 1, ref. no. 9) provides "neutral" and direction change information to the simulator, game box, etc. A forward-to-back sensor of the set of variable sensors coupled to a "forward-to-back" yoke (FIG. 1, ref. no. 11), in conjunction with the side-to-side sensor, provides gear selection information. For example, if the forward-to-back sensor is in the "forward" position and the side-to-side sensor is in the left position, these sensors would indicate that $1^{st}$ gear is selected by the user. This configuration allows the simulator software to recognize shifter location and shifter change directions. An example would be $2^{nd}$ gear being selected from $6^{th}$ gear. As the shifter is moved from $6^{th}$ gear to $2^{nd}$ gear, a constant output from the variable sensor tells the software that the transmission-gear-selection device is in neutral and is moving past $4^{th}$ gear and $3^{rd}$ gear. The six physical positions of the transmission-gear-selection device, along with a seventh reverse gear, simulate the positions and actions of a standard transmission providing "detent" gated selection, for example, be placing the shifter in a selected gear.

To provide legacy control commands for legacy simulators, legacy games, etc. that do not support "gated" shifting, the transmission-gear-selection device includes a "sequential stop" mechanism that is selectable by the user. The presently described embodiment of the transmission-gear-selection device is manually selectable by the user and manually engaged, but automatic selection and engagement can also be provided without undue experimentation. When the transmission-gear-selection device is in a disengaged position, such as the position of the device shown in FIG. 2, the sequential stop does not affect gated operation. A sequential-stop-selector knob (FIG. 2, ref. no. 1) rotates to engage and disengage the sequential stop. The sequential-stop-selector knob is coupled to a sequential stop (FIG. 2, ref. no. 5) and a sequential-stop slider assembly (FIGS. 2-3, ref. no. 3) via a stop pin fixed to a sequential-stop knob (not shown). The sequential-stop slider is configured to move forward and back relative to the sequential stop and is returned to a "centered position" by a sequential-stop-slider-return spring (FIGS. 2-3, ref. no. 2). The sequential stop is substantially fixed in place by a top case and a sequential-stop-knob-retention pin (not shown) and prevents the shifter knob assembly and shaft assembly from moving side-to-side and restricts the forward to back movement to a relatively small movement range. According to the presently described operating configuration of the transmission-gear-selection device, the device is not detented such that only forward or back (i.e., shift up, shift down) selections can be made.

When the sequential-stop knob is rotated approximately 180 degrees, the sequential-stop assembly moves forward relative to the shifter knob assembly and the shaft assembly. The shifter knob assembly and the shaft assembly may be depressed to lower the latch pins out of the way of the sliding stop assembly. Once fully engaged, the shifter knob assembly and the shaft assembly are released and the latch pins engage a set of sequential-stop-slider-assembly slots (FIG. 2, ref. no. 4), and a set of sequential-stop-travel-simulator slots (FIG. 2, ref. no. 6). Pulling or pushing the shifter knob assembly and the shaft assembly compresses the slider-return springs and rotates the forward-and-back sensor. The host relays this information as increased or decreased values and shifts the simulator gears accordingly.

It is to be understood that the exemplary embodiments described above are for illustrative purposes only and that various modifications or changes in light thereof will be suggested to persons skilled in the art and are to be included within the spirit and purview of this application and scope of the appended claims. Therefore, the above description should not be understood as limiting the scope of the invention as defined by the claims.

What is claimed is:

1. A transmission-gear-selection device comprising:
   knob means for receiving a user pushing force for shifting a simulated gear;
   shaft means coupled to the knob means for transferring knob motion and having first and second gear-latch pins; and
   shift means coupled to the shaft means for gated shifting wherein the shift means is configured to shift gears for a driving simulator and/or a driving game as the knob means and shaft means are manipulated by a user wherein the shift means for gated shifting simulates a transmission of a vehicle, which is simulated by the driving simulator and/or the driving game,
   wherein the shift means includes:
      a first gear-latch plate having a first gear aperture formed therein and configured to receive the first gear-latch pin for shifting between a first set of gears; and
      a second gear-latch plate having a second gear aperture formed therein and configured to receive the second gear-latch pin for shifting between a second set of gears,
   wherein the first set of gears and the second set of gears include different gears.

2. The device of claim 1, wherein the shift means is user configurable for sequential shifting.

3. A control device for shifting gears for a software driving game or driving simulator comprising:
   a shaft having first and second gear-latch pins;
   a first gear-latch plate having a first gear aperture formed therein and configured to receive the first gear-latch pin for shifting between a first set of gears;
   a second gear-latch plate having a second gear aperture formed therein and configured to receive the second gear-latch pin for shifting between a second set of gears, wherein the first set of gears and the second set of gears include different gears;
   a yoke coupled to the shaft and configured to provide forward and back movement of the shaft;
   a latch plate detent ball and spring coupled to the yoke configured to constrain the forward back movement of the yoke and the shaft;
   a side-to-side sensor coupled to the shaft and configured to detect lateral positions of the shaft to effect gear shifting; and
   a forward-back sensor coupled to the shaft and configured to detect forward and back positions of the shaft to effect gear shifting.

4. The control device of claim 3, wherein:
   each of the first and second gear-latch plates has an aperture formed therein through which a portion of the shaft extends and in which the shaft is configured to rotate,
   the yoke has an aperture formed therein through which another portion of the shaft extends and in which the shaft is configured to rotate, and
   the first and second gear-latch plates, the yoke, and the shaft form a gimbal that is configured to permit the shaft to be moved freely between each of the gears of the first and second sets of gears.

5. The control device of claim 4, wherein the gimbal is configured for gated shifting.

6. The control device of claim 4, further comprising:
   a side-to-side sensor coupled to the shaft and disposed adjacent to the aperture of the yoke; and
   a forward-back sensor couple to the shaft and disposed adjacent to the aperture of the second latch plate.

7. The control device of claim 6, wherein the side-to-side sensor and the forward-back sensors are configured to provide shaft position information for selected-gear information.

8. The control device of claim 3, further comprising a selection device configured to be manipulated by a user to switch the shaft between gated shift mode and a sequential shift mode.

9. The control device of claim 8, further comprising a sequential-stop slider assembly configured to guide the shaft for forward and back movement for sequential shifting.

10. The control device of claim 9, wherein the sequential-stop slider assembly includes first and second slots configured to receive the shaft such that the shaft is configured to move the sequential-stop slider assembly forward and back to effect sequential shifting.

11. The control device of claim 10, wherein the first and second slots are configured to respectively receive the first and second gear-latch pins.

12. The control device of claim 9, further comprising a set of sequential-shift sensors for sequential shifting.

13. The control device of claim 3, further comprising a sequential-stop-selector knob configured to be manipulated by a user to switch the shaft between gated shift mode and a sequential shift mode, wherein manipulation of the sequential-stop-selector knob causes the first and second gear latch pins to engage a set of sequential-slots-slider assembly slots and a set of sequential-stop-travel-simulator slots, wherein engaging the first and second gear latch pins restricts the lateral movement of the shaft.

14. The control device of claim 13, wherein manipulation of the sequential-stop-selector knob includes rotating the sequential-stop-selector knob.

\* \* \* \* \*